June 1, 1937.    H. TUNICK    2,082,472
OSCILLATION GENERATOR
Filed May 25, 1933
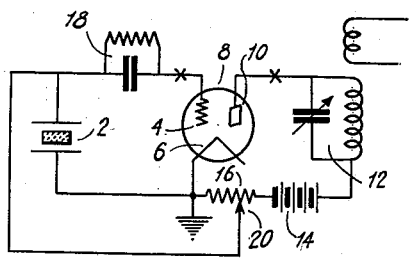
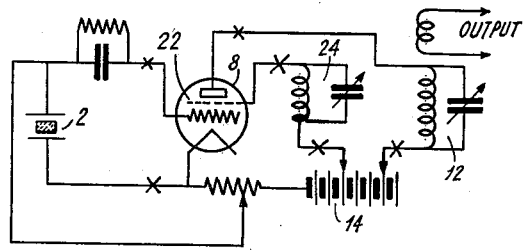
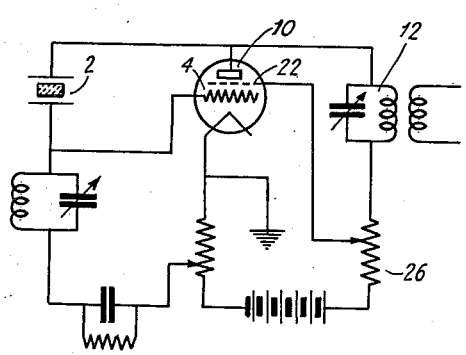
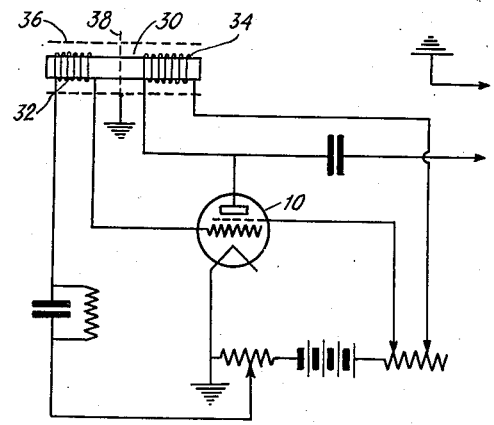
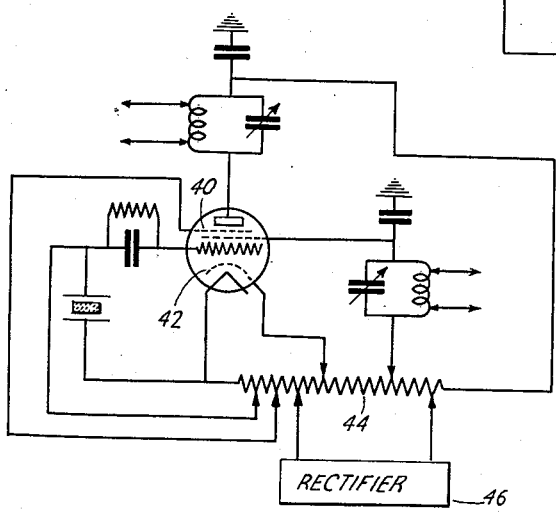
INVENTOR
HARRY TUNICK
BY
ATTORNEY Patented June 1, 1937

2,082,472

UNITED STATES PATENT OFFICE 2,082,472

OSCILLATION GENERATOR

Harry Tunick, Rye, N. Y., assignor to Radio Corporation of America, a corporation of Delaware Application May 25, 1933, Serial No. 672,766

4 Claims. (Cl. 250—36)

This invention relates to constant frequency oscillation generators and particularly to oscillation generators of the electromechanically controlled type such as crystal controlled and magnetostriction controlled vacuum tube oscillation generators.

It has been found, heretofore, that despite the sharp frequency stability of a crystal controlled oscillation generator, it has been subject to variations in frequency due to plate voltage variations. Accordingly, the prime object of my present invention is to eliminate this source of frequency variation and to do so, I provide a grid or control electrode biasing arrangement operating in such a way as to maintain current flow through the tube, and hence frequency, constant despite variations in voltage of the plate source.

In the preferred form of my invention, I combine with an electromechanically controlled oscillation generator, preferably of the crystal controlled variety, a biasing system for the control grid consisting of the combination of a grid leak and condenser returned to a resistor in the plate circuit or anode circuit of the tube. As a result of this combination, if there is any increase in plate current, the resistor in the plate-cathode return circuit tends to increase high negative bias upon the grid and hence reduce the tube D. C. current flow. If there is a decrease in the direct current component, the action is just the reverse.

From the alternating current aspect or from the high frequency output standpoint the grid leak condenser biasing arrangement acts to increase negative bias with high alternating current output whereas with low alternating current output this arrangement becomes non-effective and the return resistor comes into play to maintain proper negative bias, at which times, of course, the grid leak condenser arrangement is relatively ineffective. By suitable choice of return resistor and grid leak and condenser values, it will be found that, despite variations in plate potential, there will be substantial constancy of frequency of operation.

From another angle it can be said that my present invention provides proper relative grid bias for different values of plate potential as a result of which the changes in grid bias compensate any changes in frequency which would tend to occur due to variation in plate voltage. Thus, any increase in high frequency output is opposed by the grid leak condenser arrangement due to increased negative bias developed thereby through rectification action, whereas any decrease in high frequency output is off-set by the action of the return resistor which tends to increase the high frequency potential applied to the grid and thus maintain output more constant as will be explained more fully hereinafter.

My present invention is described more fully in connection with the accompanying drawing, wherein—

Figure 1 illustrates a preferred form of my present invention utilizing combined grid leak and condenser and plate return resistor circuits for establishing negative grid bias.

Figure 2 illustrates a modification of my present invention applied to a screen grid type of tube wherein the screen grid is used as an anode, Figure 3 is a modification wherein compensation is maintained by the combined action of several grids in a tube, Figure 4 illustrates the present invention applied to an oscillator of the magnetostriction type, and, Figure 5 is a further modification utilizing a tube having a space charge screen grid and stabilizer grid.

Referring to Figure 1, a piezo-electric crystal 2 is connected between a grid 4 and cathode or filament 6 of electron discharge device 8 having in addition an anode 10. The plate is connected in series with parallel tuned circuit 12 tuned slightly above the natural crystal frequency, or slightly above any one of its harmonics which it is desired to sustain. A source of plate potential 14 subject to voltage variations, and a resistor 16, complete the series return to the filament 6.

The grid leak condenser combination 18 is not brought directly to the filament 6 as is the usual case, but is returned to some point 20 along the return resistor 16 disposed between the negative end of source 16 and cathode 6. It is to be noted that the resistor 16 is not by-passed with a condenser.

In action it will be found that the oscillator described maintains the frequency of oscillation very constant despite variation in voltage of the plate potential source 14. This may be explained by virtue of the fact that should there be a decrease in plate voltage the high frequency potential developed across that portion of the high frequency resistance 16 between the cathode 6 and tapping point 20 will serve to increase the radio frequency output. If there is an undue increase in radio frequency output due to an increase in the plate potential source, increased negative bias developed by the grid leak condenser combination 18 will serve to compensate for this reverse change in potential of source 14.

The grounding connection of the filament may be removed and in place thereof any one of the points X may be grounded, if desired, leaving the rest of the elements of the system to assume their own radio frequency potentials.

In the arrangement shown in Figure 2, the tube 8 is provided with an additional electrode in the form of screen grid 22 which is connected to the plate source 14 through tunable circuit 24. As before, the plate is provided with a tuned circuit 12. The circuits 24 and 12 may be tuned to substantially like frequencies and to substantially, a desired frequency of operation of the crystal 2, namely, one of its fundamental frequencies, or any harmonic thereof. Or, if desired, circuit 24 may be tuned to a fundamental frequency of crystal 2 and circuit 12 to some harmonic thereof. In the alternative, circuit 24 may be tuned to a harmonic of crystal 2 and circuit 12 to the fundamental, or still further in the alternative, circuit 24 may be tuned to the fundamental or to some harmonic of crystal 2 and circuit 12 to some sub-harmonic. Or, both circuits may be tuned to like or different harmonics. Output energy may be taken inductively as indicated from the circuit 12, and/or a similar arrangement may be coupled to the circuit 24.

In the arrangement shown in Figure 3, the crystal 2 is connected between the plate 10 and the usual grid or control grid 4, tuned circuits being connected between the grid and cathode and the plate and cathode. To augment the corrective action, the screen grid 22 may be tapped to a resistor 26 between the plate potential source and the plate tuning circuit 12. Preferably, the cathode is grounded as shown, and the usual by-passing condenser for the screen grid omitted although, if desired, it may be used.

In the arrangement shown in Figure 4, the magnetostrictive rod 30 is coupled by virtue of coil 32 to the grid-cathode circuit of the tube 10 and to the anode circuit by virtue of coil 34. These coils are, preferably, electrostatically shielded from each other. The shielding may be carried out by means of cylindrical slitted slabs 36 disposed exteriorly of the coils as illustrated, there being provided also a transverse shield 38.

In the arrangement shown in Figure 5, the suppressor grid 40 and the space charge grid 42 are connected along the potentiometer 44 supplied by rectifier 46 to get best compensation. Incidentally, it is to be pointed out that the potentiometer rectifier arrangement shown in Figure 5 may be used in lieu of the potential source shown in Figures 1 to 4 inclusive, or the potential source of Figures 1 to 4 inclusive may be replaced by a D. C. generator shunted, preferably, by a by-passing condenser. The tuning of the plate and screen grid circuits shown in Figure 5 may be as explained in connection with Figure 2.

Having thus described my invention, what I claim is:

1. A constant frequency oscillation generator comprising a tube having a cathode, a first grid, a second grid, and an anode, a frequency controlling system connected to a pair of said electrodes, a source of anode potential, a first resistor connected between one terminal of said source and said cathode, a second resistor connected between another terminal of said source and said anode, a circuit consisting of the parallel combination of a condenser and a third resistor, said circuit being connected to said first grid and through at least a portion of said first resistor to said cathode, and a connection from said second grid to a point on the second said resistor, the respective values of said resistors being so chosen that oscillations are generated at a substantially constant frequency despite variations from normal in the potential of said source.

2. A constant frequency generator comprising an electron discharge device having an anode, a cathode, a control grid, and a screen grid, a piezo-electric crystal connected to a pair of said electrodes, a source of anode potential, a first resistor connected between said source and said anode, a second resistor connected between said source and said cathode, a biasing connection between said control grid and said cathode, said biasing connection including at least a portion of said first resistor and the parallel combination of a condenser and a third resistor, a connection from said screen grid to a point on that resistor which is connected to said anode, and a tuned high frequency circuit connected between said anode and cathode.

3. A constant frequency oscillation generator comprising a tube having an anode, a cathode, a screen grid, and a control grid, a piezo-electric crystal connected between said control grid and cathode, a source of anode potential, a first resistor connected between said source and said cathode, a tuned high frequency circuit connected between said anode and said source, a tuned high frequency circuit connected between said screen grid and source, a circuit consisting of a condenser and a second resistor in parallel, means connecting one terminal of the last said circuit to said control grid, and means connecting the other terminal of the last said circuit to a point on the first said resistor remote from its connection to said cathode.

4. A high frequency generator comprising an electron discharge device having a cathode, an anode and a plurality of grids including a control grid and a screen grid, a frequency controlling system connected between said control grid and one of the other electrodes of said discharge device, a source of potential connected between said cathode and anode, a resistor interposed between said cathode and said source, a second resistor interposed between said source and said anode, a connection from said source to said screen grid for polarizing the same, and means including a grid biasing circuit connected between said control grid and a point on the first said resistor remote from its connection to the cathode for producing a normally negative bias on said control grid, means for increasing the negative bias on the control grid in response to an increase in amplitude of the oscillatory output energy from said generator.

HARRY TUNICK.